United States Patent
Sherstoboev et al.

(10) Patent No.: US 10,979,470 B2
(45) Date of Patent: *Apr. 13, 2021

(54) SERVER DEVICE, CLIENT DEVICE AND DYNAMIC IMAGE TRANSMISSION METHOD FOR VIRTUAL DESKTOP INFRASTRUCTURE

(71) Applicant: INDUSTRIAL TECHNOLOGY RESEARCH INSTITUTE, Hsinchu (TW)

(72) Inventors: Dmitry Sherstoboev, Hsinchu County (TW); Tzi-Cker Chiueh, Taipei (TW); Chuan-Yu Cho, Hsinchu (TW); Tian-Jian Wu, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 57 days.

This patent is subject to a terminal disclaimer.

(21) Appl. No.: 15/241,056

(22) Filed: Aug. 18, 2016

(65) Prior Publication Data
US 2017/0187775 A1    Jun. 29, 2017

Related U.S. Application Data

(63) Continuation-in-part of application No. 14/980,614, filed on Dec. 28, 2015, now abandoned.

(30) Foreign Application Priority Data
Dec. 31, 2015   (CN) .......................... 201511027189.4

(51) Int. Cl.
*H04L 29/06*   (2006.01)
*H04N 19/23*   (2014.01)

(52) U.S. Cl.
CPC ........... *H04L 65/602* (2013.01); *H04N 19/23* (2014.11)

(58) Field of Classification Search
CPC ..... H04L 65/602; G06F 3/0481; H04N 19/23; H04N 19/29
See application file for complete search history.

(56) References Cited

U.S. PATENT DOCUMENTS 7,895,523 B2 * 2/2011 Stockton ............. G06F 16/9577
                                                    715/747
10,147,115 B1 * 12/2018 Bidarkar ............ G06Q 30/0246
(Continued)

FOREIGN PATENT DOCUMENTS

CN    102446189 A    5/2012
CN    102547394 A    7/2012
(Continued)

OTHER PUBLICATIONS

Miou et al., "An intelligent Chinese pen-based secure screen phone for new PSTN services", International Symposium on Proceedings of 1997, Dec. 2-4, 1997.
(Continued)

*Primary Examiner* — Javier O Guzman
(74) *Attorney, Agent, or Firm* — Rabin & Berdo, P.C.

(57) ABSTRACT

A server device, a client device and a dynamic image transmission method for a virtual desktop infrastructure are provided. The dynamic image transmission method for the virtual desktop infrastructure includes the following steps. A region information of a dynamic image displayed on a server device is detected by the server device. The region information is transmitted to a client device by the server device. The dynamic image is rendered on the client device according to the region information. The dynamic image is obtained from an Internet by the client device according to a network link information obtained from the server device,
(Continued)

or the dynamic image is obtained by decompressing a compressed data provided from the server device.

14 Claims, 10 Drawing Sheets

(56) References Cited

U.S. PATENT DOCUMENTS

| | | | |
|---|---|---|---|
| 10,225,570 B2* | 3/2019 | Wei | H04N 19/433 |
| 2003/0041106 A1* | 2/2003 | Tuli | H04L 69/329 |
| | | | 709/203 |
| 2006/0047634 A1* | 3/2006 | Aaron | G06F 16/335 |
| 2006/0130118 A1* | 6/2006 | Damm | H04N 21/8456 |
| | | | 725/135 |
| 2010/0162338 A1* | 6/2010 | Makhija | H04N 21/2402 |
| | | | 725/114 |
| 2010/0254622 A1* | 10/2010 | Kamay | H04N 21/23418 |
| | | | 382/239 |
| 2012/0284632 A1* | 11/2012 | Baird | G06F 9/452 |
| | | | 715/749 |
| 2013/0050253 A1* | 2/2013 | Jooste | G06F 17/30899 |
| | | | 345/629 |
| 2013/0204927 A1* | 8/2013 | Kruglikov | G06F 9/54 |
| | | | 709/203 |
| 2014/0026050 A1 | 1/2014 | Yun | |
| 2014/0229527 A1* | 8/2014 | Bidarkar | G06F 9/54 |
| | | | 709/203 |
| 2014/0325323 A1 | 10/2014 | Liu et al. | |
| 2015/0163281 A1* | 6/2015 | Liu | H04L 67/025 |
| | | | 715/740 |
| 2016/0127213 A1* | 5/2016 | Shimada | H04L 12/6418 |
| | | | 709/219 |
| 2016/0342313 A1* | 11/2016 | Gross | G06F 3/1415 |
| 2017/0142432 A1* | 5/2017 | Wei | H04N 19/127 |

FOREIGN PATENT DOCUMENTS

| | | |
|---|---|---|
| CN | 101902471 B | 1/2013 |
| CN | 103685433 A | 3/2014 |
| CN | 103902244 A | 7/2014 |
| CN | 102761603 B | 10/2014 |
| CN | 104112440 A | 10/2014 |
| TW | 201101065 A | 1/2011 |
| TW | 201413590 A | 4/2014 |
| TW | 201426325 A | 7/2014 |
| TW | 201435709 A | 9/2014 |
| WO | WO 2014-089793 A1 | 6/2014 |
| WO | WO 2014-121477 A1 | 8/2014 |

OTHER PUBLICATIONS

Taiwanese Office Action dated Sep. 11, 2017.
Pieter Simoens et al., "Design and implementation of a hybrid remote display protocol to optimize multimedia experience on thin client devices", Telecommunication Networks and Applications Conference, pp. 391-396, Dec. 7-10, 2008.
S. Ma, Ed. et al., "Survey of Virtual Desktop Infrastructure System draft-ma-appsawg-vdi-survey-00", Applications Area Working Group, May 13, 2011.
Ha-Young Ko et al., "Implementation and Evaluation of Fast Mobile VNC Systems", Implementation and Evaluation of Fast Mobile VNC Systems, pp. 1211-1218, Dec. 28, 2012.
Jae-Hyeok Lee et al., "Fast Modified Region Detection for Mobile VNC Systems", 4th International Conference on Awareness Science and Technology, pp. 146-149, Aug. 21-24, 2012.
Kheng-Joo Tan et al., "A Remote Thin Client System for Real Time Multimedia Streaming Over VNC", 2010 IEEE International Conference on Multimedia and Expo (ICME), pp. 992-297, Jul. 19-23, 2010.
S. Sridhar et al., "Adaptive Display Virtualization and Dataflow Model Selection (ADVADAMS) for reducing Interaction Latency in Thin Clients", 2012 International Conference on Recent Trends in Information Technology (ICRTIT), pp. 233-238, Apr. 19-21, 2012.
Chinese Office Action dated Aug. 21, 2019.

* cited by examiner

SERVER DEVICE, CLIENT DEVICE AND DYNAMIC IMAGE TRANSMISSION METHOD FOR VIRTUAL DESKTOP INFRASTRUCTURE

This is a continuation-in-part application of co-pending application Ser. No. 14/980,614, filed on Dec. 28, 2015, and claims the benefit of People's Republic of China application serial No. 201511027189.4, filed on Dec. 31, 2015, the content of which is incorporated herein by reference.

TECHNICAL FIELD

The disclosure relates in general to a dynamic image transmission method for a virtual desktop infrastructure, and a server device and a client device using the dynamic image transmission method.

BACKGROUND

In a virtual desktop infrastructure, normally the frame rate for a server device to transmit a picture to a client device from is about 1 to 2 fps. However, if the user wants to view a dynamic image, a higher frame rate, such as 24 fps, is required for the server device to transmit the dynamic image to the client device. Under such circumstance, the dynamic image can be smoothly played on the server device, but may become unsmooth or choppy after the dynamic image is transmitted from the server device and played on the client device. In order to achieve a better quality of viewing the dynamic image, a dynamic image transmission method for a virtual desktop infrastructure is provided.

SUMMARY

According to one embodiment, a dynamic image transmission method for a virtual desktop infrastructure is provided. The dynamic image transmission method for a virtual desktop infrastructure includes the following steps. A region information of a dynamic image displayed on a server device is detected by the server device. The region information is transmitted to a client device by the server device. The dynamic image is rendered on the client device according to the region information. The dynamic image is obtained from an Internet by the client device according to a network link information obtained from the server device, or the dynamic image is obtained by decompressing a compressed data provided from the server device.

According to another embodiment, a server device is provided. The server device comprises a processing unit and a transmission unit. The processing unit detects a region information of a dynamic image. The transmission unit transmits the region information to a client device. The transmission unit further transmits a network link information of the dynamic image or a compressed data of the dynamic image to the client device.

According to an alternative embodiment, a client device is provided. The client device includes a receiving unit, a processing unit and a display unit. The receiving unit receives a dynamic image and a region information of the dynamic image. The processing unit obtains the dynamic image and the region information from the receiving unit, and renders the dynamic image according to the region information. The display unit displays the dynamic image. The receiving unit obtains the dynamic image from an Internet according to a network link information; or the receiving unit obtains a compressed data from a server device and obtains the dynamic image by decompressing the compressed data by the processing unit.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
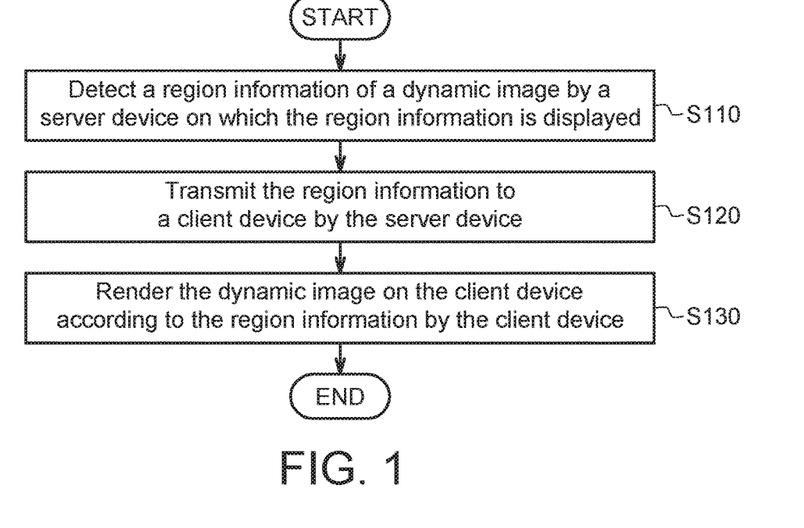
FIG. 1 is a flowchart of a dynamic image transmission method of the present disclosure.

Referring to FIG. 1, a flowchart of a dynamic image transmission method of the present disclosure is shown. The dynamic image transmission method includes the following steps. Firstly, the method begins at step S110. A region information of a dynamic image displayed on a server device is detected by the server device. Next, the method proceeds to step S120. The region information is transmitted to a client device by the server device. Lastly, the method proceeds to step S130. The dynamic image is displayed on the client device according to the region information.

Figure 2:
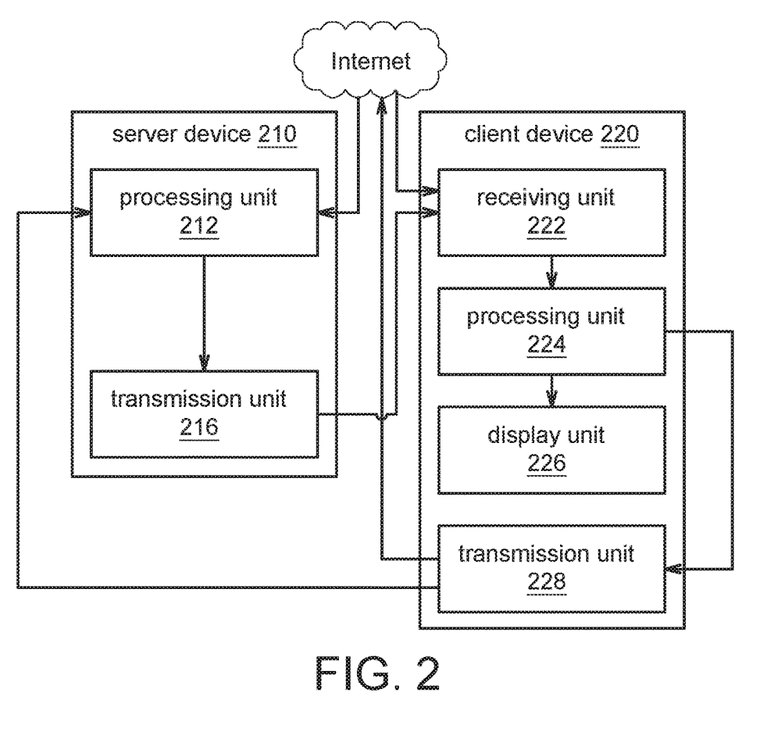
FIG. 2 is a block diagram of a virtual desktop infrastructure according to a first embodiment of the present disclosure.

The dynamic image transmission method of the present disclosure is elaborated below in two embodiments. FIG. 2 is a block diagram of a virtual desktop infrastructure according to a first embodiment of the present disclosure. In the first embodiment, the virtual desktop infrastructure transmits a dynamic image provided from a webpage. The virtual desktop infrastructure includes a server device 210 and a client device 220. The server device 210 can be realized by such as a computer host. The server device 210 includes a processing unit 212 and a transmission unit 216. The client device 220 can be realized by such as a mobile phone, or a computer host. The client device 220 includes a receiving unit 222, a processing unit 224 and a display unit 226.

Figure 3:
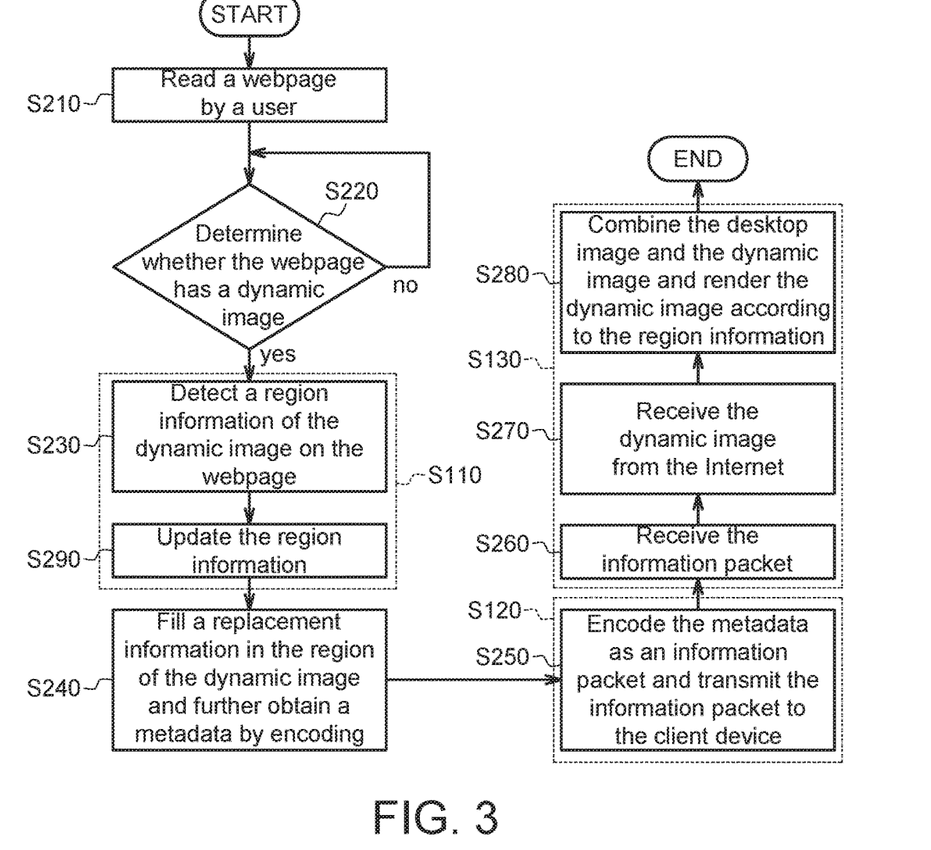
FIG. 3 is a flowchart of a dynamic image transmission method according to a first embodiment of the present disclosure.

Refer to FIG. 2, FIG. 3 and FIGS. 4A to 4E. FIG. 3 is a flowchart of a dynamic image transmission method according to a first embodiment of the present disclosure. FIGS. 4A to 4E are schematic diagrams of the dynamic image transmission method of FIG. 3. Firstly, the method begins at step S210. A webpage is read form the Internet by a user. The webpage includes a dynamic image such as a film, a 3D animation, or a dynamic picture. Next, the method proceeds to step S220. Whether the webpage has a dynamic image is determined by the processing unit 212. If the webpage has a dynamic image, then the method proceeds to step S230. A region information of the dynamic image on the webpage is detected by the processing unit 212, and this step is the step S110 of FIG. 1.

Figure 4A:
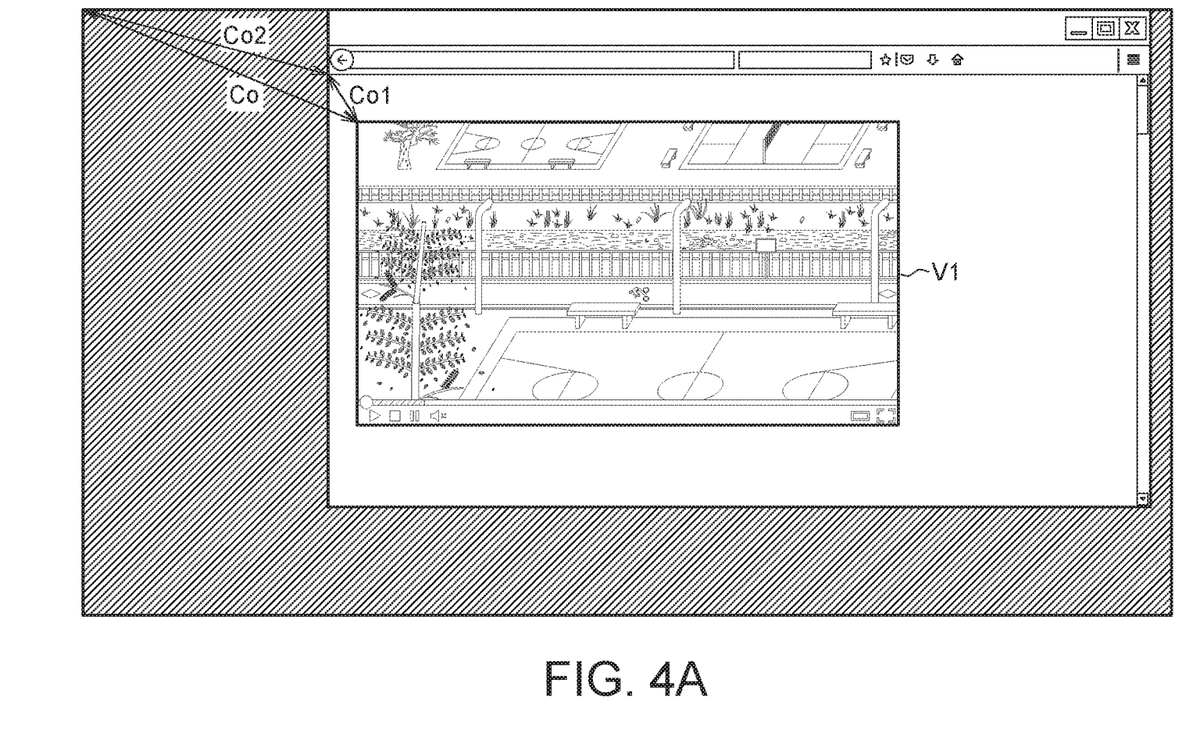
FIGS. 4A to 4E are schematic diagrams of the dynamic image transmission method of FIG. 3.

As indicated in FIG. 4A, the server device 210 displays a webpage on a browser. The webpage displays a dynamic image in a dynamic image region (designated by a region V1 of FIG. 4A). In the first embodiment, the processing unit 212 may include a browser extension, which detects the region information displayed on a webpage of a website. The region information may include a display coordinate and a display size corresponding to the dynamic image. To put it in greater details, the detection of the region information of the dynamic image may further include the following steps. The browser extension detects a relative coordinate of the dynamic image displayed on the webpage with respect to the dynamic image of the webpage as indicated by a double direction arrow Co1 of FIG. 4A. The browser extension further detects the display size of the dynamic image. For example, the dynamic image has a play area of width 400 by height 300, that is, 400*300. Then, a view coordinate of the webpage with respect to a display region of the server device 210 as indicated by a double direction arrow Co2 of FIG. 4A is obtained. In an embodiment, the view coordinate can be obtained using a browser built kit or a windows operating system application program interface (Windows API). After the view coordinate is obtained, a display coordinate of the dynamic image (designated by a double direction arrow Co of FIG. 4A) is generated according to the relative coordinate (designated by the double direction arrow Co1) and the view coordinate (designated by the double direction arrow Co2) of the dynamic image.

Figure 4B:
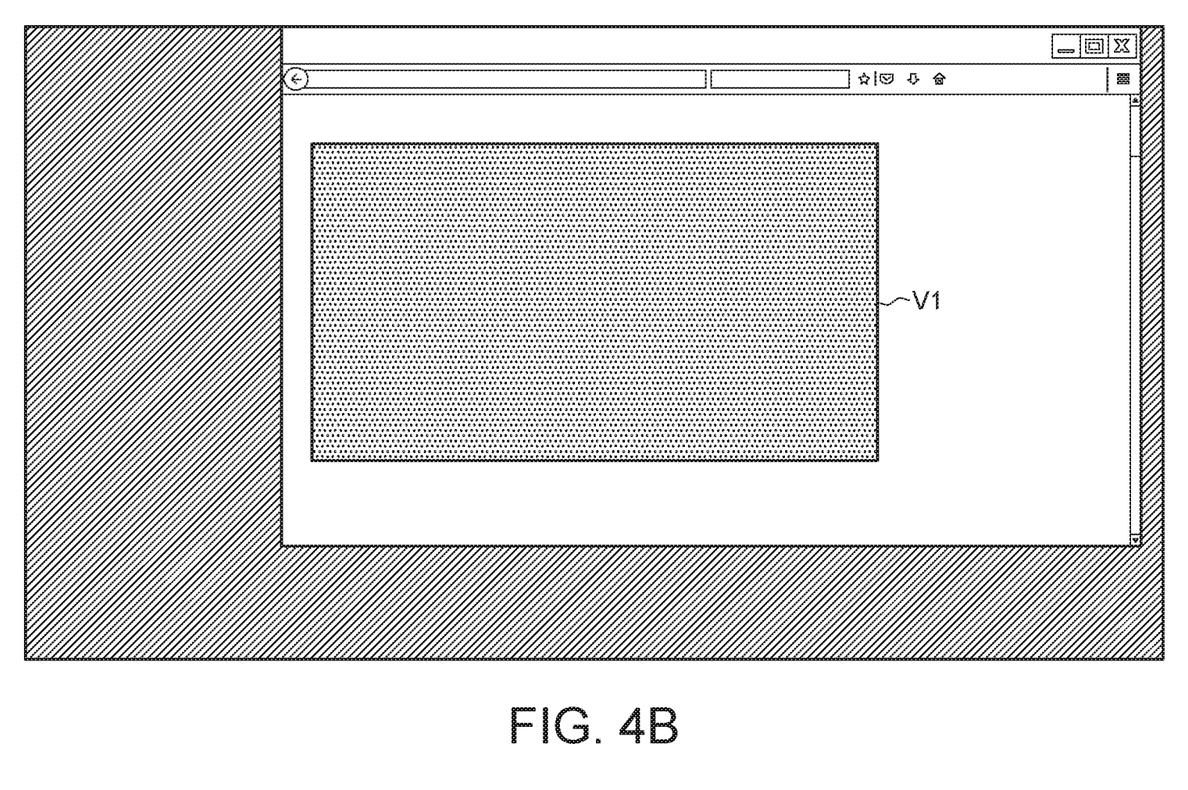
Figure 4C:
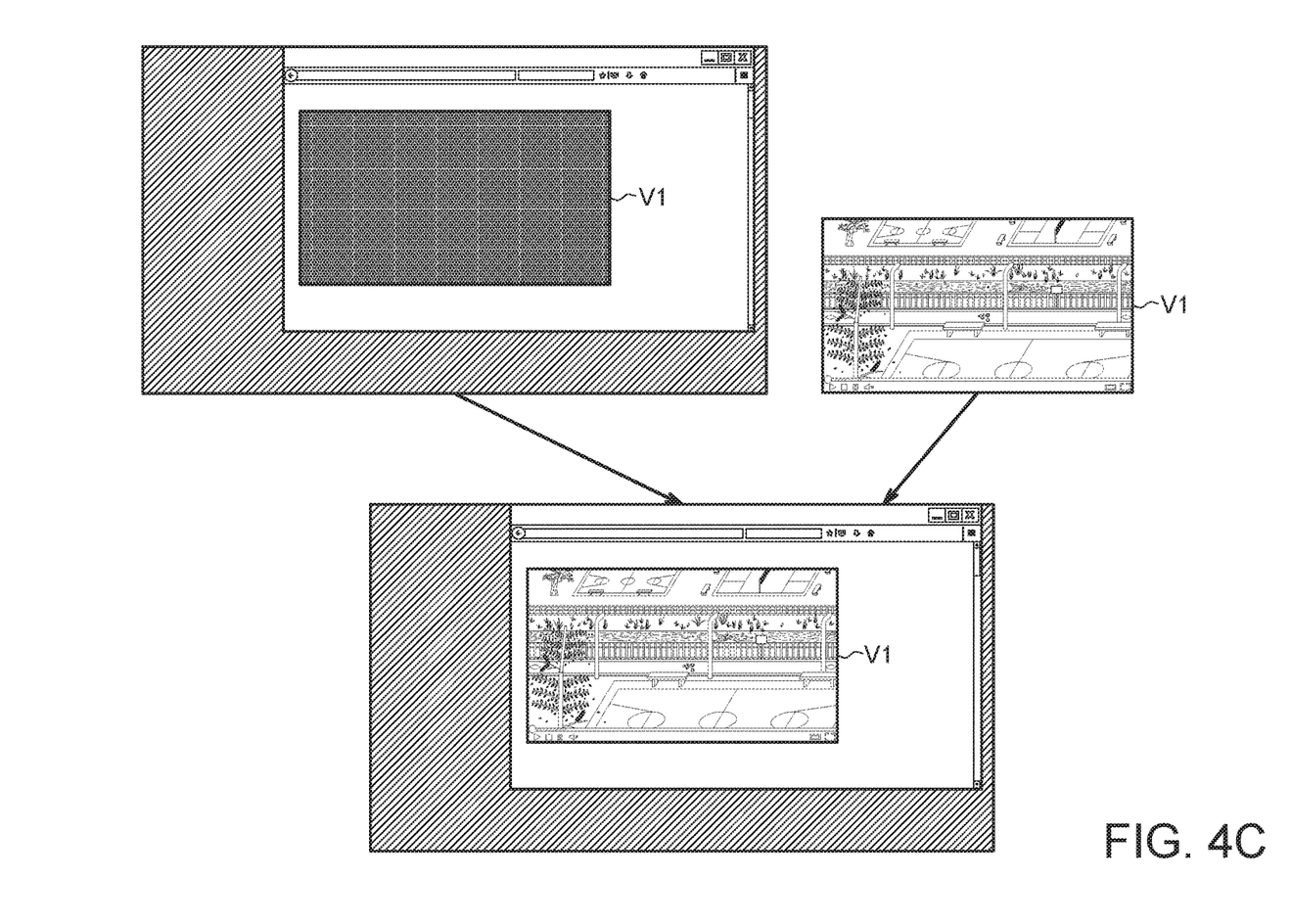

After the region information of the dynamic image on the webpage is obtained, the method proceeds to step S240, a desktop image of the server device 210 is captured by the processing unit 212. The desktop image is such as the complete frame currently displayed by the server device 210, that is, the full frame of FIG. 4A. In step S240, a replacement data (as indicated in FIG. 4B) is filled in a region of the desktop image corresponding to the dynamic image by the processing unit 212. The replacement data is such as a monochromatic frame or a special striped frame which differentiates itself from other display regions. In step S240, the region information, the desktop image and the replacement data are encoded as a metadata by the processing unit 212. In step S250, the metadata is encoded as an information packet and transmitted to the client device 220 by the processing unit 212. This step is the step S120 of FIG. 1. The step S130 of FIG. 1 may include steps S260 to S280. In step S260, the information packet is received by the receiving unit 222 of the client device 220. In step S270, a network link information, such as a website address (URL), is obtained from the information packet by the client device 220, and the dynamic image is received from the Internet according to the website address (URL). After the receiving unit 222 of the client device 220 receives the region information of the dynamic image and the dynamic image, the method proceeds to step S280, the desktop image and the dynamic image are combined and the dynamic image is rendered by the processing unit 224 according to the region information, such that the dynamic image is displayed by the display unit 226. In the present embodiment, the processing unit 224 directly receives the dynamic image from a webpage of the Internet through a website address. That is, after the receiving unit 222 receives the dynamic image and the desktop image respectively, the processing unit 224 further combines the desktop image and the dynamic image as indicated in FIG. 4C.

Figure 4D:
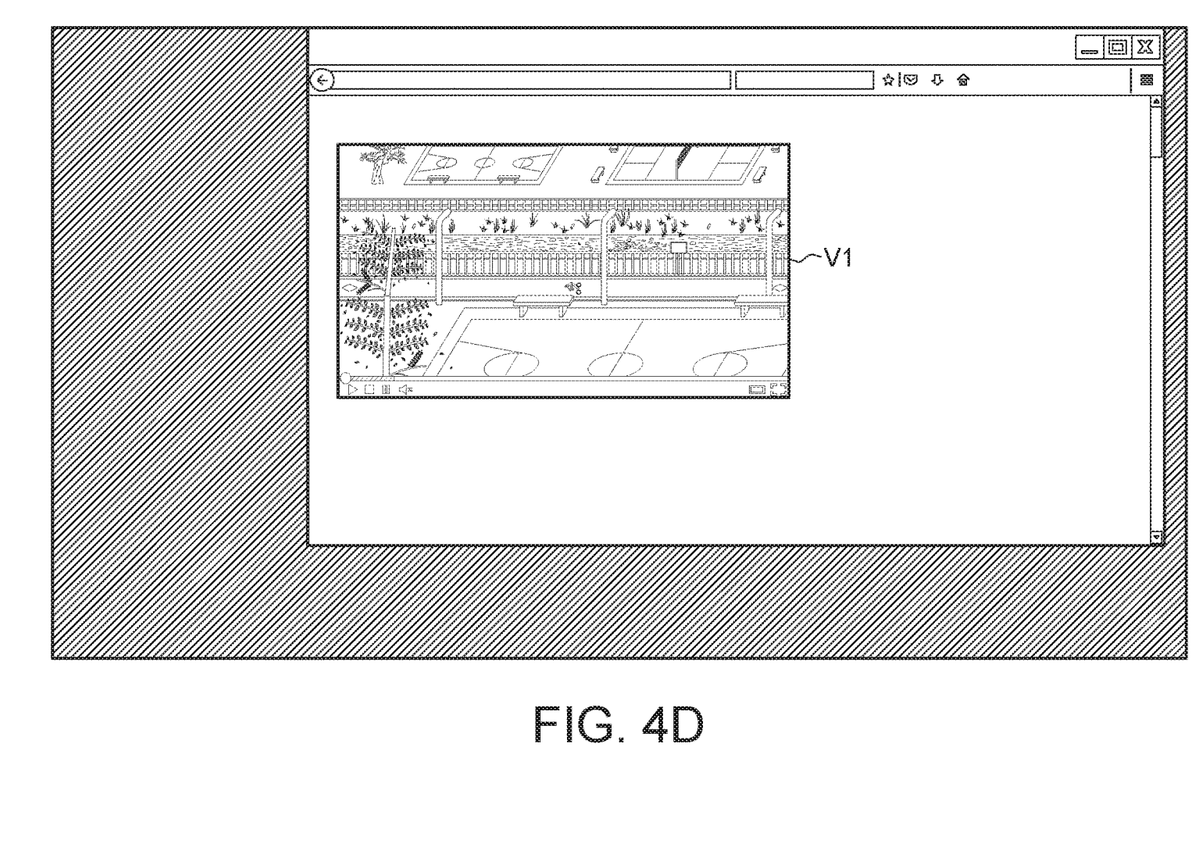

In an embodiment, the dynamic image transmission method further detects whether the region of the dynamic image is changed so that the display content of the client device can be updated instantly. The region of the dynamic image on the webpage may change. For example, when the user browses the webpages, the display coordinate or the display size of the dynamic image may change if the user switches the browser tab, scrolls, zooms, updates or closes the webpage, or reduces, enlarges or moves the browser window. Referring to FIG. 4D, a reduction of a dynamic image is shown. Therefore, the step S110 of FIG. 1 may further include step S290. When the display coordinate or the display size of the dynamic image changes (for example, when the dynamic image moves or scales), the method proceeds to step S290, the dynamic image is detected again and the region information is updated by the processing unit 212. Then, the method proceeds to steps S240 to S280, the updated dynamic image is instantly displayed by the display unit 226 of the client device 220 according to the updated region information. In this embodiment, the client device 220 further includes a transmission unit 228. When the user switches the tabs of the browser, scrolls the web pages, re-adjust the scaling of the web pages, updates the web pages, closes the web pages, zooms out the browser windows, zooms in the browser windows, or move the browser windows to change the coordinate or the size of the dynamic image, the transmission unit 228 transmits the adjusting command to the server device 210. The processing unit 212 detects the dynamic image and updates the region information. In this embodiment, the processing unit 224 further generates a controlling interface corresponding the dynamic image. The display unit 226 displays the controlling interface. The controlling interface can be used to play, pause, fast forward, backward, adjust volume, display by play full-screen, narrow or enlarge. After the processing unit 224 detects an operating information on the controlling interface, the transmission unit 228 transmits the operating information to the internet to adjust the state of the dynamic image.

Figure 4E:
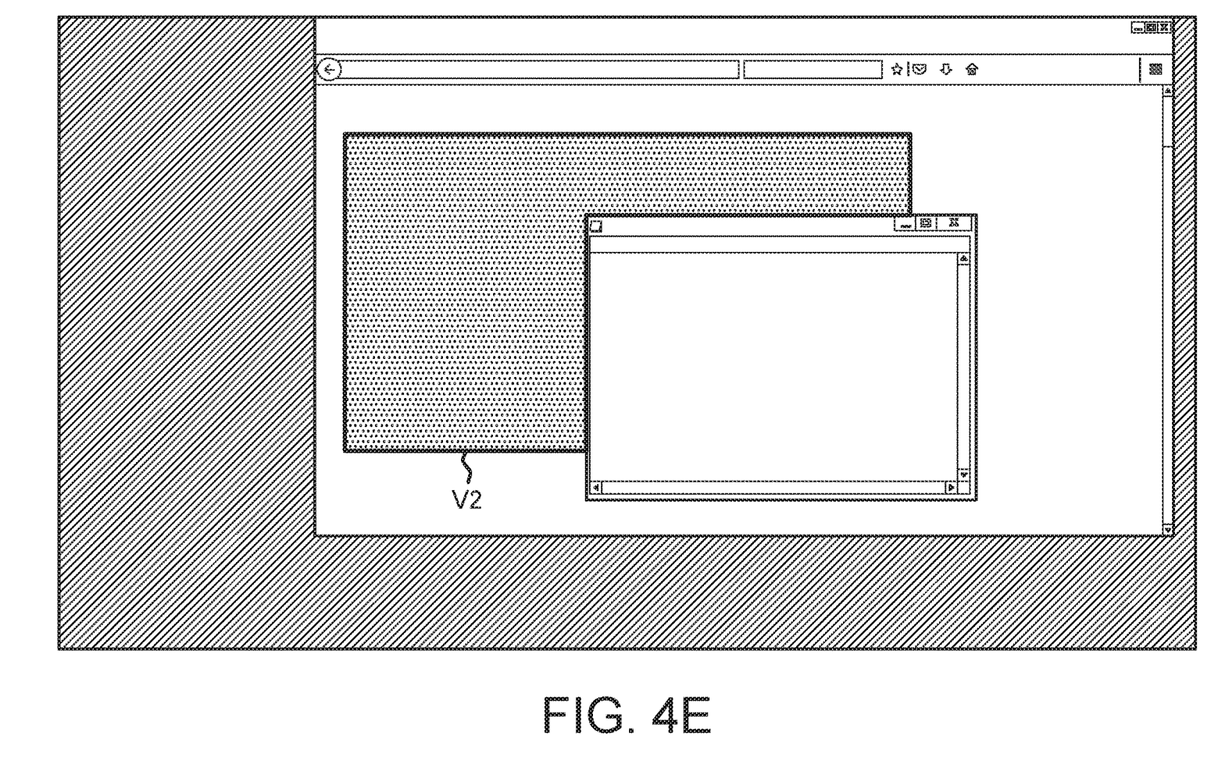

In an embodiment, the change of the region of the dynamic image further includes a window covering the dynamic image as indicated in FIG. 4E. Meanwhile, if the dynamic image is displayed according to the originally detected region information, the dynamic image may cover the window. Under such circumstance, the method proceeds to step S290 too. The dynamic image is detected again and the region information is updated by the processing unit 212. For example, the processing unit 212, based on the display region, determines whether the replacement data is covered by a window, and changes the region of the dynamic image to be the region of the replacement data which is uncovered by the window (designated by the region V2 of FIG. 4E), so that the client device 220 can display the dynamic image on the region V2.

Figure 5:
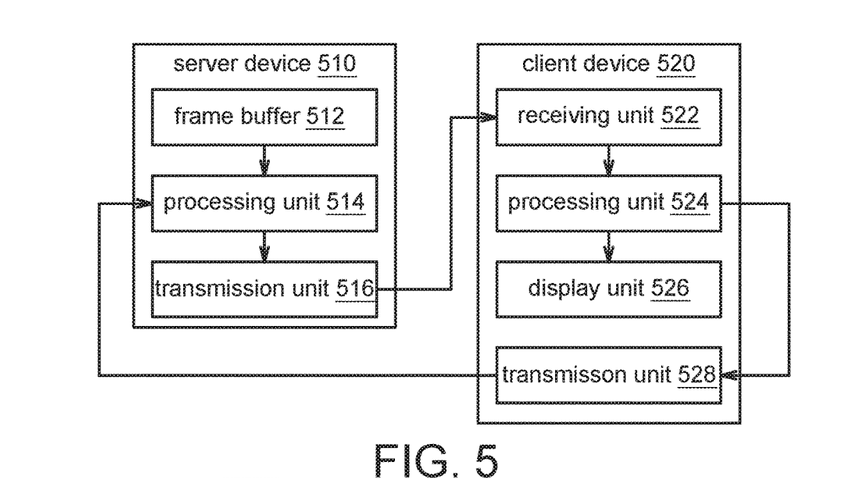
FIG. 5 is a block diagram of a virtual desktop infrastructure according to a second embodiment of the present disclosure.

FIG. 5 is a block diagram of a virtual desktop infrastructure according to a second embodiment of the present disclosure. In the second embodiment, the virtual desktop infrastructure includes a server device 510 and a client device 520. The virtual desktop system transmits a dynamic image played by a dynamic image play program of the server device 510. Similarly, the dynamic image is such as a film, a 3D animation, or a dynamic picture. The dynamic image play program can be realized by a film player such as Adobe Flash or HTML5, or a play program for 3D animation or dynamic picture. Like the server device 210 of the first embodiment, the server device 510 also includes a processing unit 514 and a transmission unit 516. The server device 510 further includes a frame buffer 512 for storing the dynamic image. The client device 520 also includes a receiving unit 522, a processing unit 524 and a display unit 526.

Figure 6:
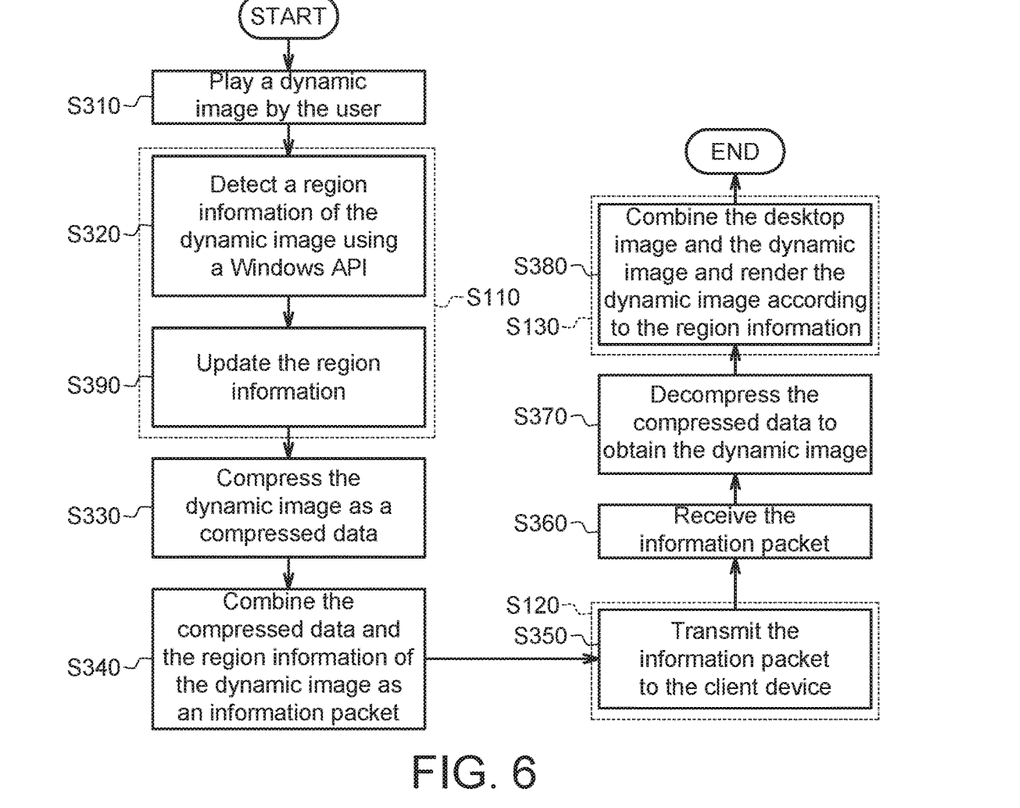
FIG. 6 is a flowchart of a dynamic image transmission method according to a second embodiment of the present disclosure.
Figure 7:
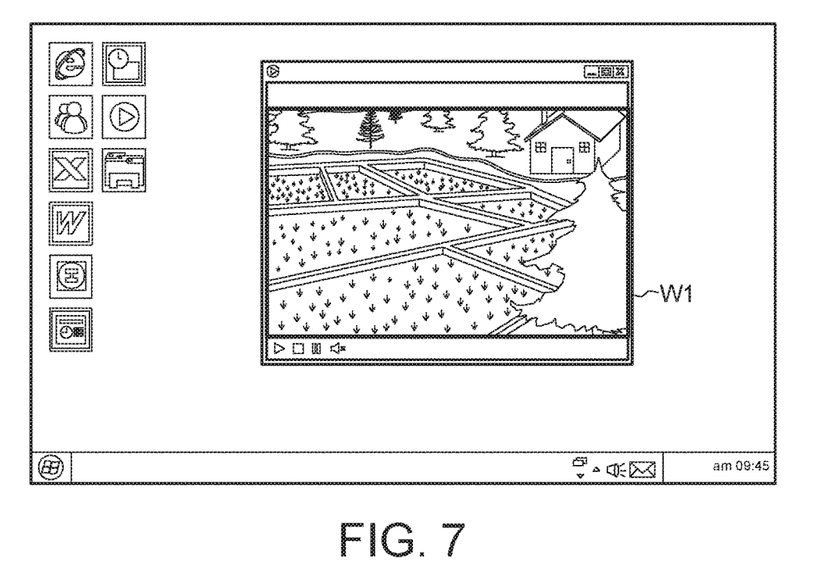
FIG. 7 is a schematic diagram of the dynamic image transmission method of FIG. 6.

The dynamic image transmission method according to a second embodiment of the present disclosure is disclosed below with reference to FIGS. 5 to 8. FIG. 6 is a flowchart of a dynamic image transmission method according to a second embodiment of the present disclosure. FIG. 7 is a schematic diagram of the dynamic image transmission method of FIG. 6. Firstly, the method begins at step S310. A dynamic image is played by the user using a dynamic image play program. Next, the method proceeds to step S320. A region information of a dynamic image is detected by the processing unit 514. In the present embodiment, the processing unit 514 includes a windows operating system application program interface (Windows API). In step S320, the region information of the dynamic image played by a dynamic image play program is detected using the Windows API. This step is the step S110 of FIG. 1.

As indicated in FIG. 7, the dynamic image is played by the server device 510 using a dynamic image play program W1 of FIG. 7. Like the steps disclosed in the first embodiment, the processing unit 514 detects a relative coordinate of the dynamic image with respect to the dynamic image play program. The processing unit 514 further detects the display size of the dynamic image. Then, a view coordinate of the dynamic image play program in the server device 520 with respect to the display region of the server device 520 is detected using a Windows API. Lastly, the display coordinate of the dynamic image is generated according to the relative coordinate and view coordinate.

After the region information is detected, the method proceeds to step S330. The dynamic image is compressed as a compressed data by the processing unit 514. In the present embodiment, the dynamic image is not received via the Internet, and the processing unit 514 applies lossy compression on the dynamic image stored in the frame buffer 512. Then, the method proceeds to step S340. The desktop image (the full frame of FIG. 7) of the server device 510 is captured by the processing unit 514, and the compressed data, the region information of the dynamic image, and the desktop image are combined as an information packet. Then, the method proceeds to step S350. The information packet is transmitted to the client device 520 by the transmission unit 516. This step is the step S120 of FIG. 1. Then, the method proceeds to step S360. The information packet is received by the receiving unit 522 of the client device 520. After the information packet, that is, the region information of the dynamic image and the compressed data, are received, the method proceeds to step S370. The compressed data is decompressed by the processing unit 524 to obtain the dynamic image. Lastly, the method proceeds to step S380. The desktop image and the dynamic image are combined and the dynamic image is rendered by the processing unit 524 of the client device 520 according to the region information, such that the dynamic image is displayed by the display unit 526. This step is the step S130 of FIG. 1.

Similarly, in the present embodiment, the dynamic image transmission method further detects whether the region of the dynamic image is changed so that the display content of the client device can be updated instantly. For example, the region of the dynamic image may be changed as the user moves the position of the dynamic image play program, or reduces or enlarges the window of the dynamic image play program. Likewise, the step S110 of FIG. 1 may further include step S390. When the display coordinate or the display size of the dynamic image changes (for example, when the dynamic image moves or scales), the method proceeds to step S390, the dynamic image is detected again and the region information is updated by the processing unit 514. Then, the method proceeds to steps S330 to S350, the updated dynamic image is instantly displayed by the display unit 526 of the client device 520 according to the updated region information. Similarly, in this embodiment, the client device 520 further includes a transmission unit 528. When the user moves the dynamic image play program, narrow or enlarge the window of the dynamic image play program, the transmission unit 528 transmits the adjusting command to the server device 510. The processing unit 514 detects the dynamic image and updates the region information. In this embodiment, after the processing unit 524 detects an operating information on a button, such as a play button, or a controlling interface, the transmission unit 528 transmits the operating information to the server device 510. The processing unit 514 of the server device 510 receives the operating information and adjusts the state of the dynamic image according to the operating information.

Figure 8:
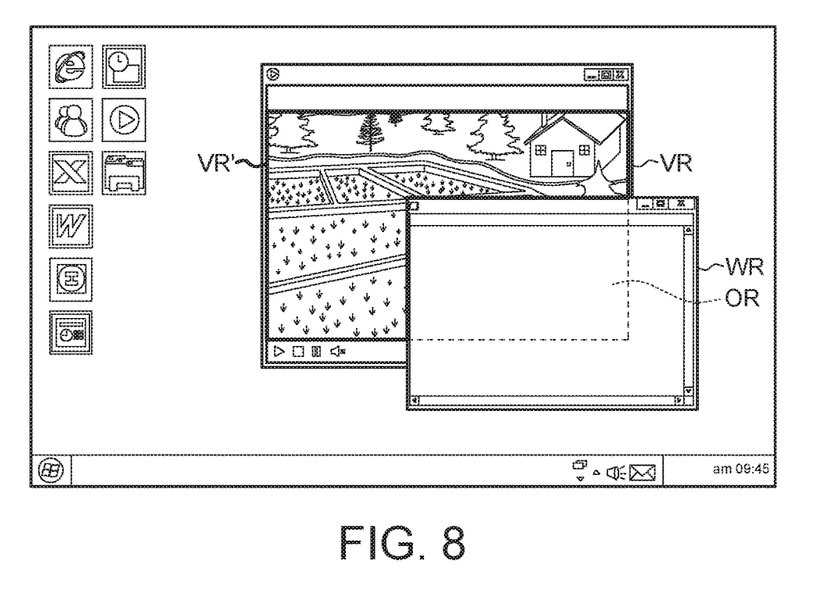
FIG. 8 is a schematic diagram of a window covering a dynamic image region.

Similarly, in the dynamic image transmission method of the present embodiment, whether a window overlaps the region of the dynamic image is detected so that the display content of the client device can be instantly updated. If it is detected that there is a window covering the dynamic image, the method proceeds to step S390, the dynamic image is detected again and the region information is updated by the processing unit 514. FIG. 8 is a schematic diagram of a window covering a dynamic image region. As indicated in FIG. 8, the processing unit 514 determines whether the region of the dynamic image is covered by a window. For example, whether the region of the dynamic image is covered by a window is determined according to the region information detected by a Windows API. If it is determined that the region of the dynamic image is covered by a window, a window display coordinate and a window display size of the window (such as the coordinate and the size of the region WR of FIG. 8) are detected using the Windows API. Then, an overlapping region information is obtained according to the region information and the window. For example, the coordinate and the size of an overlapping region OR can be obtained according to the coordinates and the sizes of the region VR of the dynamic image and the region WR of the window. Then, the region of the dynamic image is updated according to the region information and the overlapping region. For example, the region VR of the dynamic image is updated as the region VR' of the dynamic image by removing the overlapping region OR off the region VR of the dynamic image, such that the display unit 526 can display the dynamic image on the updated region.

Figure 9:
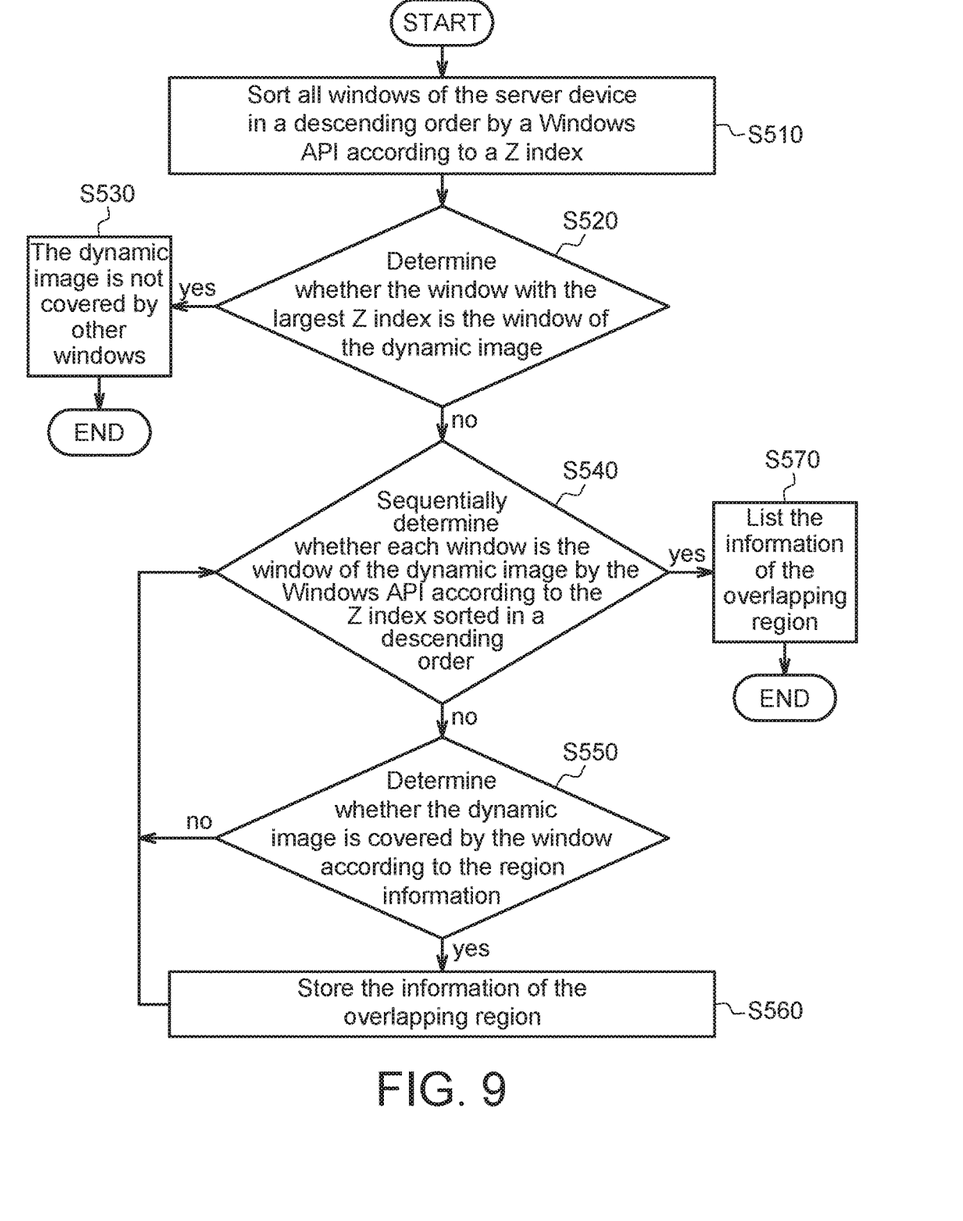
FIG. 9 is a flowchart of a method for analyzing a dynamic image being covered by a window.

FIG. 9 is a flowchart of a method for analyzing a dynamic image being covered by a window. Firstly, the method proceeds to step S510. All windows of the server device are sorted in a descending order by a Windows API according to a Z index. Then, the method proceeds to step S520. Whether the window with the largest Z index is the window of the dynamic image is determined. If so, this implies that the window of the dynamic image is at the topmost layer, and the method proceeds to step S530, it is determined that the dynamic image is not covered by other windows. If it is determined in step S520 that the window with the largest Z index is not the window of the dynamic image, then the method proceeds to step S540. Whether each window is the window of the dynamic is sequentially determined by the Windows API according to the Z index sorted in a descending order. If it is determined in step S540 that one window is not the window of the dynamic image, then the method proceeds to step S550. Whether the dynamic image is covered by this window is determined according to the region information. If it is determined in step S550 that the dynamic image is covered by the window, then the method proceeds to step S560. The information of the overlapping region is stored. Steps S540, S550 and S560 can be repeated for many times, and the determination starts with the topmost layer of the windows with the largest Z index until the layer of the window of the dynamic image. Meanwhile, if it is determined in step S540 that the current window is the window of the dynamic image, then the method proceeds to step S570. The information of the overlapping region is listed.

According to the above embodiments, dynamic image transmission methods and a server device and a client device using the same are disclosed. The server device detects a region information, and further transmits the region information to the client device. After receiving the dynamic image, the client device, instead of transmitting the image of the complete frame, further displays the dynamic image according to the region information, not only reducing the data volume of transmission and maintaining the display quality of the dynamic image but also avoiding the dynamic image being non-smooth or choppy. Thus, the user can have a better experience of viewing the dynamic image. Besides, in the present disclosure, whether the dynamic image region changes is detected so that the updated frame can be displayed instantly for the convenience of the user's operation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dynamic image transmission method for a virtual desktop infrastructure (VDI), comprising:
    determining, by a server device, whether a webpage in a desktop image has a dynamic image;
    detecting a region information of the dynamic image by the server device on which the dynamic image is displayed, only if the webpage has the dynamic image;
    filling a replacement data in a region of the dynamic image by the server device, only if the webpage has the dynamic image, wherein
    the replacement data is a monochromatic frame or a striped frame;
    transmitting the region information and the desktop image filled with the replacement data to a client device by the server device; and
    rendering the dynamic image on the client device according to the region information by the client device,
    wherein the dynamic image is obtained from the Internet according to network link information obtained from the server device;
    wherein the step of detecting the region information of the dynamic image includes:
    detecting, by a browser extension, a relative coordinate of the dynamic image displayed on the webpage with respect to the webpage;
    obtaining, by a Windows API, a view coordinate of the webpage with respect to a display region;
    generating a display coordinate of the dynamic image according to the relative coordinate and the view coordinate.

2. The dynamic image transmission method for the virtual desktop infrastructure according to claim 1, wherein the region information comprises a display size of the dynamic image.

3. The dynamic image transmission method for the virtual desktop infrastructure according to claim 1, wherein in the step of detecting the region information of the dynamic image by the server device on which the dynamic image is displayed, the region information is updated when the dynamic image is covered by a window.

4. The dynamic image transmission method for the virtual desktop infrastructure according to claim 1, wherein if the dynamic image is obtained from the Internet, the dynamic image transmission method further comprises:
    generating and displaying a controlling interface corresponding the dynamic image by the client device; and
    detecting operating information on the controlling interface and transmitting the operating information to the Internet by the client device for adjusting a state of the dynamic image.

5. The dynamic image transmission method for the virtual desktop infrastructure according to claim 1, wherein if the dynamic image is obtained from the server device, the dynamic image transmission method further comprises:
    generating and displaying a controlling interface corresponding the dynamic image by the client device;
    detecting operating information on the controlling interface and transmitting the operating information to the server device by the client device; and
    adjusting, by the server device, a state of the dynamic image according to the operating information.

6. A server device, comprising:
    a processing unit for determining whether a webpage has a dynamic image and detecting a region information of the dynamic image only if the webpage has the dynamic image, wherein a browser extension detects a relative coordinate of the dynamic image displayed on the webpage with respect to the webpage, a Windows API obtains a view coordinate of the webpage with respect to a display region, and a display coordinate of the dynamic image is generated according to the relative coordinate and the view coordinate; and
    a transmission unit for filling a replacement data in a region of the dynamic image only if the webpage has the dynamic image, and transmitting the region information and the desktop image filled with the replacement data to a client device,
    wherein the transmission unit further transmits network link information of the dynamic image to the client device, and
    wherein the replacement data is a monochromatic frame or a striped frame.

7. The server device according to claim 6, wherein the region information comprises a display size of the dynamic image.

8. The server device according to claim 6, wherein the processing unit further updates the region information when the dynamic image region is covered by a window.

9. The server device according to claim 6, wherein the processing unit is further for receiving operating information and adjusting a state of the dynamic image.

10. A client device, comprising:
 a receiving unit for receiving a dynamic image, a region information of the dynamic image, and a desktop image which is filled with a replacement data in a region of the dynamic image only if a webpage in the desktop image has the dynamic image;
 a processing unit for obtaining the dynamic image, the region information, and the desktop image from the receiving unit, wherein the processing unit renders the dynamic image combined with the desktop image according to the region information, a browser extension detects a relative coordinate of the dynamic image displayed on the webpage with respect to the webpage, a Windows API obtains a view coordinate of the webpage with respect to a display region, and a display coordinate of the dynamic image is generated according to the relative coordinate and the view coordinate; and
 a display unit for displaying the dynamic image combined with the desktop image;
 wherein the receiving unit obtains the dynamic image from the Internet according to network link information; and
 wherein the replacement data is a monochromatic frame or a striped frame.

11. The client device according to claim 10, wherein the region information comprises a display size.

12. The client device according to claim 10, wherein the receiving unit continues to receive and update the region information.

13. The client device according to claim 10, further comprising:
 a transmission unit;
 wherein the processing unit generates a controlling interface corresponding the dynamic image; the display unit displays the controlling interface; the processing unit detects operating information on the controlling interface; and if the dynamic image is obtained from the Internet, the transmission unit transmits the operating information to the Internet.

14. The client device according to claim 10, further comprising:
 a transmission unit;
 wherein the processing unit generates a controlling interface corresponding the dynamic image; the display unit displays the controlling interface; the processing unit detects operating information on the controlling interface; and if the dynamic image is obtained from the server device, the transmission unit transmits the operating information to the service device.

* * * * *